United States Patent [19]

Francis

[11] Patent Number: 4,843,728
[45] Date of Patent: Jul. 4, 1989

[54] SAW GUIDE WITH CUT LOCATION INDICATOR

[75] Inventor: John G. R. Francis, Manning, S.C.

[73] Assignee: Trigometrics, Inc., Manning, S.C.

[21] Appl. No.: 38,175

[22] Filed: Apr. 14, 1987

[51] Int. Cl.$^4$ .............................................. B43I 13/02
[52] U.S. Cl. ......................................... 33/640; 33/42; 33/373
[58] Field of Search ...................... 30/376; 33/403, 42, 33/474, 476, 479, 480, 481, 640

[56] References Cited

U.S. PATENT DOCUMENTS 4,306,479 12/1981 Eberhardt ........................ 33/479 X
4,494,434 1/1985 Young .............................. 33/479 X Primary Examiner—William D. Martin, Jr.
Attorney, Agent, or Firm—Sughrue, Mion, Zinn, Macpeak & Seas

[57] ABSTRACT

A straightedge is made of a sawable material, and is fixed relative to a saw guide, and the saw guide is provided with multiple guide surfaces so that guiding the saw along the different guide surfaces of the saw guide will cut the straightedge to form multiple cut location indicators.

5 Claims, 7 Drawing Sheets

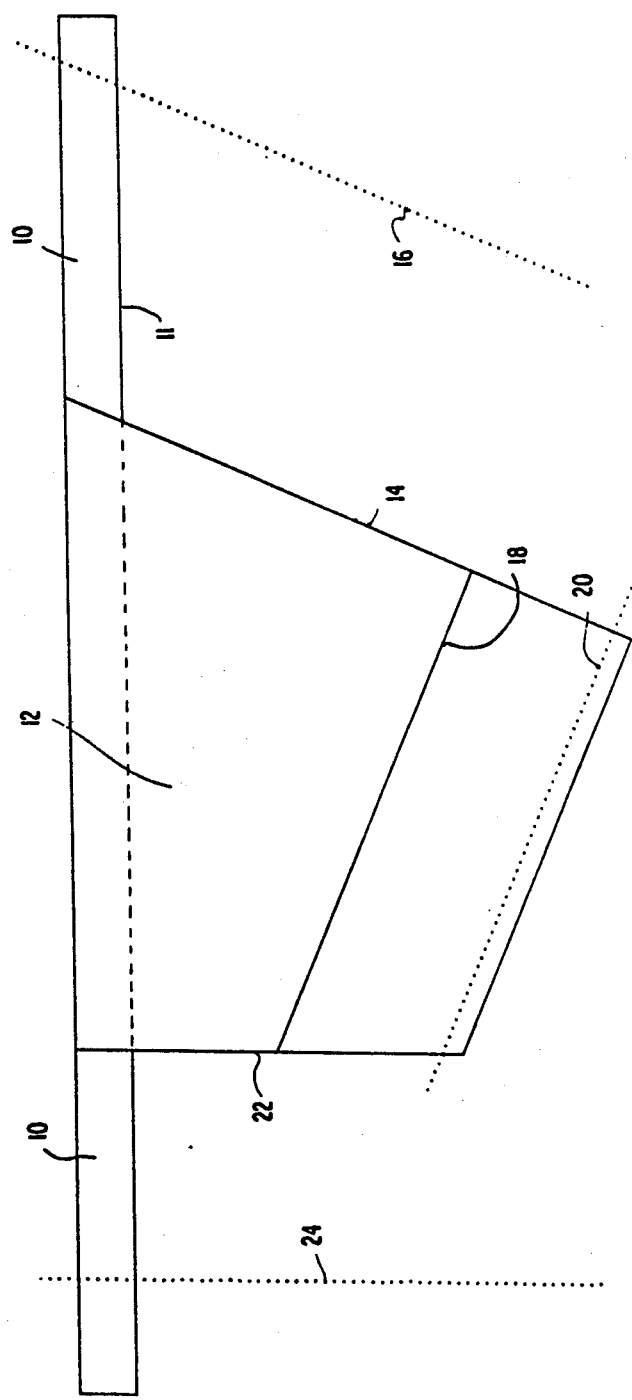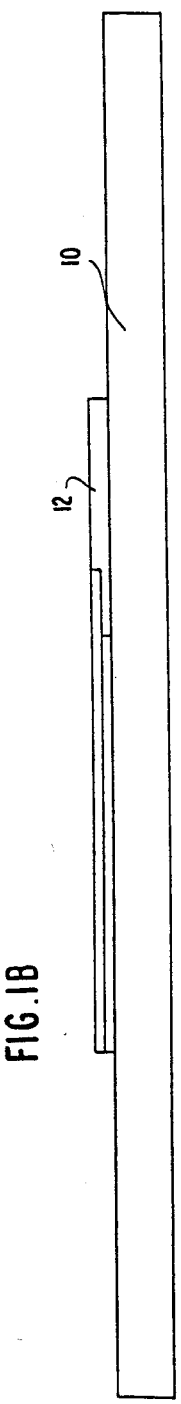

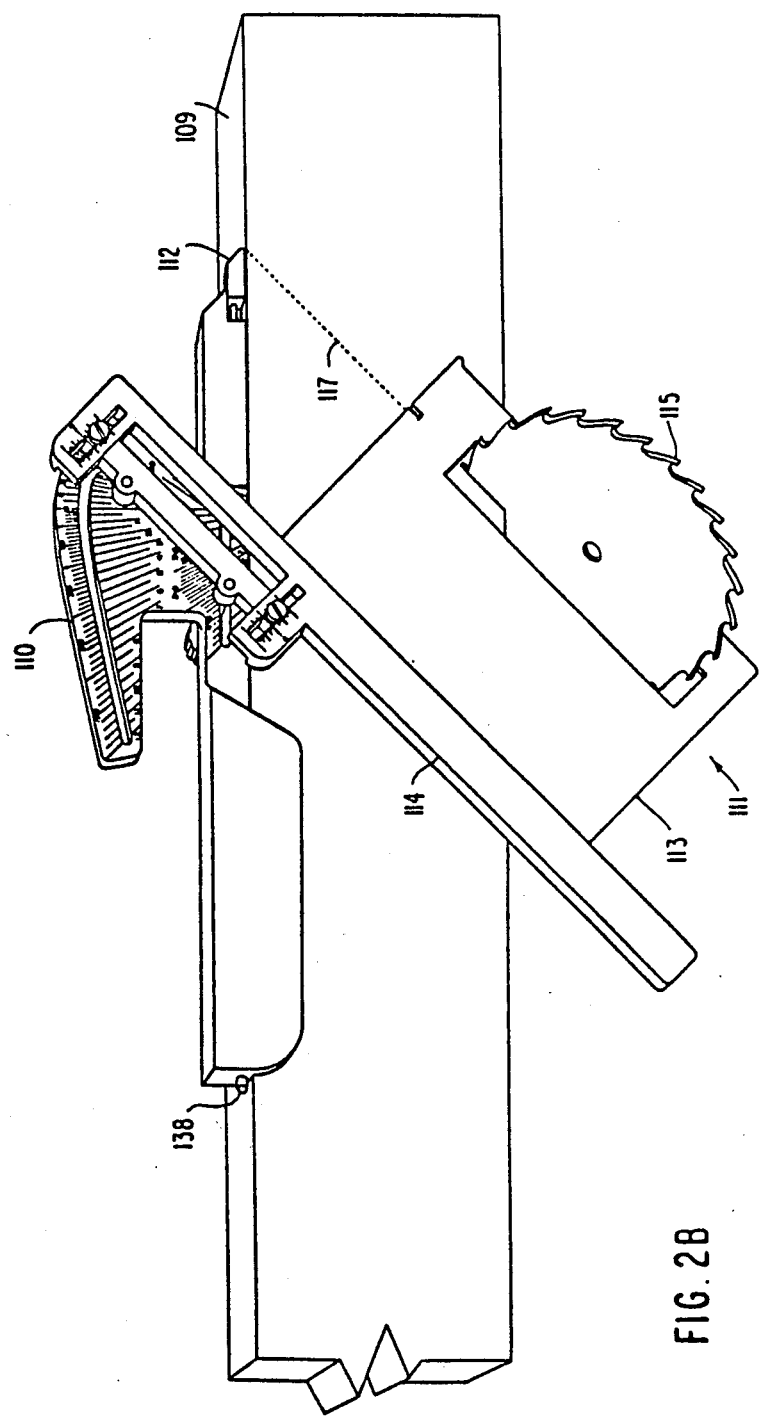

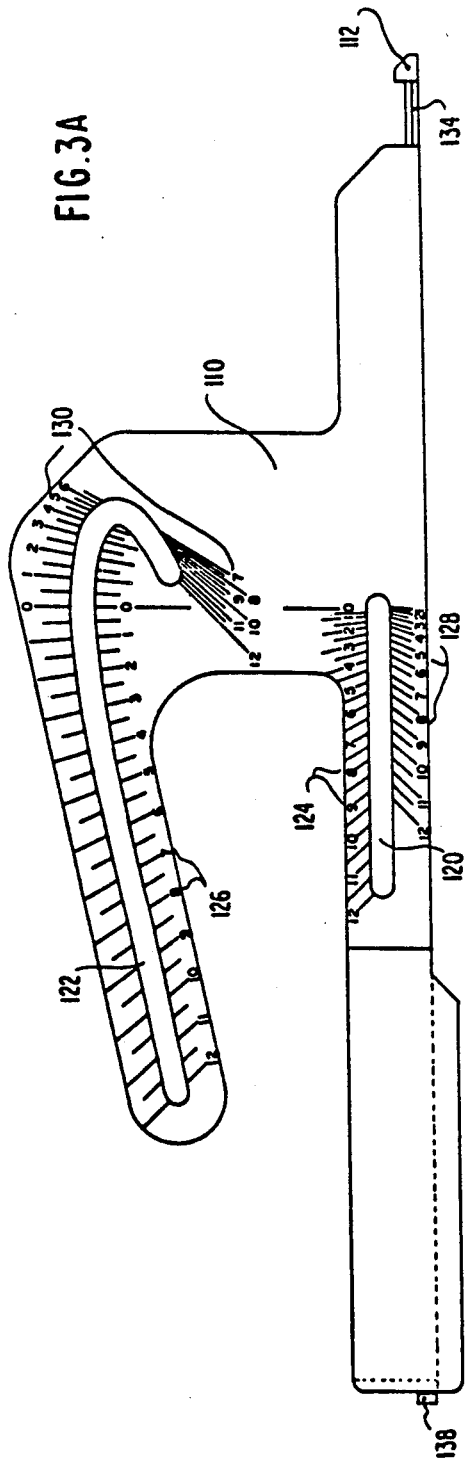
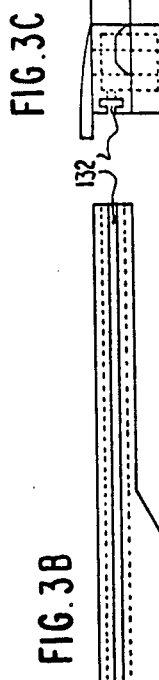
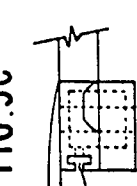
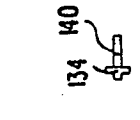

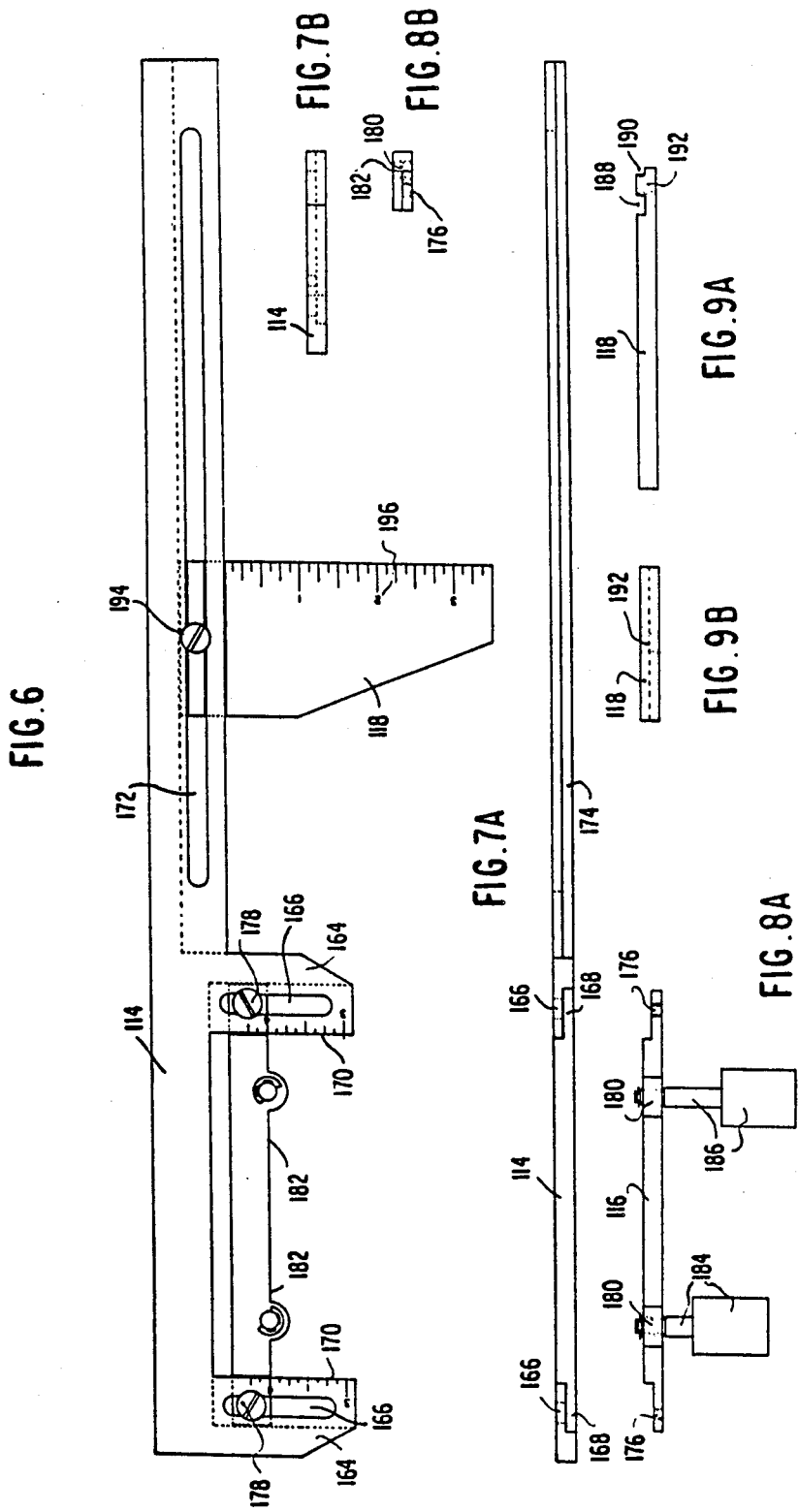

SAW GUIDE WITH CUT LOCATION INDICATOR

This application is related to application Ser. No. 574,425, filed Jan. 27, 1984, now U.S. Pat. No. 4,607,434.

BACKGROUND OF THE INVENTION

This invention is directed to hand-held guides used with hand-held power saws. Such saws typically have motor driven circular blades mounted on an adjustable plate. The plate can be moved up and down to adjust the depth of the saw cut and can be rotated up to 45° in a direction perpendicular to the plane of the blade and creating either square or angular saw cuts. The blade protrudes through a slot in the plate which on most such saws is located approximately 3 to 4 inches from one side and 1½ to 2 inches from the other side of the plate. Most saws are designed for righthand use, with the motor mounted to the left side of the plate and the 4-inch distance between slot and side also located to the left.

In normal use, a line is drawn with a straightedge. The user must then visually align the saw blade with the line from the start of cut throughout the cutting process. Such a procedure is dangerous, and the accuracy of the cuts is limited to the ability of the user.

Persons who desire to make consistently straight cuts use various types of straightedge devices as a guide against which the edge of the saw plate can be moved. A number of such guides are available, some of which have fixed angles and others of which can be varied to produce different angles of cut. However, since the saw blade is offset from the sides of the plate, the straightedges have to be positioned varying distances away from the desired line of cut, with the distances varying as the angle of cut is changed, as the blade is rotated with respect to the plate, from saw-to-saw due to varying locations of the slot, with different saw blades with varying cut widths, etc.

One example of a power saw guide is disclosed in U.S. Pat. No. 4,054,077 to Gram. The Gram device includes a base plate 12 in the form of an isosceles triangle having two sides of equal and opposite angle for cutting identical "negative" and "positive" acute anges. Transverse to the angled sides is an index member 14 which can be held against the near edge of the member to be cut. The power saw base plate can be run along either of the angled sides of the saw guide base plate 12, and in doing so the index 14 will be cut off parallel to the edge of the saw guide base plate 12 and at a distance indicating the location of the cut. In all future cutting operations with the same saw, the edge of the index 14 will serve as a cut location indicator. There are a number of problems characteristic of the Gram device. For example, the lower surface of the saw guide base plate 12 will be flush with the upper surface of the board to be cut, but the index member 14 is embedded in a groove in the lower surface of the base plate 12, with the result that the upper surface of the index member 14 will be at a higher level than the upper surface of the material being cut. Due to this raised index, the saw guide must always be placed on the near side of the board, since the base plate of the power saw itself will collide with the index member 14 if the member 14 is placed on the far side of the board. Accordingly, the guide member of Gram must be rotated through 180° in order to cut both acute angles, and must be flipped upsidedown to cut the square angle along the edge which forms the base of the isosceles triangle.

Further, the index 14 is at an angle with respect to the guide 18. The direction of rotation of the saw blade, by design, pulls the bottom of the saw's platform down against the surface of the material being cut. As the saw is passed over the edge 20 and along line 48, the front right corner of the power saw base plate will be pulled downward toward the material being cut, while the raised level of the index 14 in the Gram saw guide device will keep the left-front corner of the power saw base plate at a higher level, thereby torquing and binding the saw blade.

Further, with regard to the grooved design illustrated in FIGS. 3-7 of the Gram patent, the groove will keep the left side of the power saw platform at the level of the index, and once again the natural forces of the saw will pull down the right front corner of the power saw platform, thereby changing the plane of the cut. This is even true of the square cut made with index 132 in FIG. 7.

As described in the Gram patent, that device is designed for use on a flat workbench in which there are dowels to hold the device in a fixed position. Its large size, unique shape, etc. render it unsuitable for a number of common power saw applications, e.g., the cutting of rafters in the field using saw horses for support.

Other saw guide devices are disclosed in: U.S. Pat. No. 1,568,115 to Weaver; U.S. Pat. No. 2,581,766 to McConnell; U.S. Pat. No. 2,625,184 to Harbert; U.S. Pat. No. 2,668,347 to Schmidt; U.S. Pat. No. 2,719,548 to Mitchell; U.S. Pat. No. 2,735,445 to Forsberg; U.S. Pat. No. 2,773,523 to Hopla; U.S. Pat. No. 4,179,965 to Johnson; and U.S. Pat. No. 4,281,572 to Stovall. These references generally teach a number of variable angle saw guides, but all have been unsatisfactory for a number of reasons. One feature common to all of these conventional variable-angle saw guides is that the pivot point of the saw guide is a single, non-variable and coincident point of rotation, i.e., a hole drilled in both the fixed member and the saw guide through which a single bolt or rivet is passed. The pivot point cannot be placed along the cut line, since a pivot pin would then be in the path of the saw blade. Accordingly, the pivot point is offset from the line of the cut. If the fixed member of such a saw guide is clamped to a saw board and a number of saw cuts are made while varying the saw guide through its entire range of angles, not only the angle of the cut but also the position thereof will be varied. Thus, upon varying the cut angle, the operator cannot determine where the cut will end up.

Since conventional variable-angle guide devices do not provide for a common point of intersection for all cuts regardless of angle, each has found it necessary to attach its saw cut location index to the movable portion of the guide, rather than to the fixed member. For example, U.S. Pat. No. 2,719,548 to Mitchell discloses a cumbersome cut location indicator device which is as long as the saw guide itself. As illustrated in FIG. 1 thereof, two hinges 11 are necessary to pivot the indicator out of the way prior to making a cut.

U.S. Pat. No. 2,772,523, to Hopla discloses a simple wire-type indicator which is also attached to the guide. The design of the Hopla device is such that it cannot be sufficiently repetitive and must also be rotated out of the way.

U.S. Pat. No. 4,179,965 to Johnson discloses a saw guide having an adjustable cutting angle which can also accommodate power saws having different blade offsets. In the Johnson device, the width of the guide can be adjusted to be equal to the blade offset of the saw. The guide is first placed with its outside edge located on the desired line of cut, a pencil mark is made along the inside edge of the guide, and the guide is then re-positioned so that its outside edge is along the new mark. This is a cumbersome operation.

The use of conventional saw guide devices is often aggravating, and few power saw operators utilize straightedges despite the loss of accuracy and the significant increase in danger, e.g., if the saw is not passed across the material in a straight line, the blade tends to bind and run backwards into the operator. Hand-held power saws are perhaps the most dangerous tool utilized in normal carpentry, and there is a great need for a simple, easy-to-use and effective power saw guide which will be more readily used by power saw operators.

SUMMARY OF THE INVENTION

It is therefore an object of the present invention to provide a saw guide which is easier to use and which eliminates the above-described disadvantages while maintaining a relatively simple and inexpensive construction.

It is a further object of this invention to provide a saw guide which is capable of one-handed operation.

In accordance with a first embodiment of the present invention, a straightedge and a saw guide are both made of a sawable material. Guiding the saw along the edges of the guide will generate cut position indicators at desired angles and properly corresponding to the blade offset of whatever side is used to make the initial guide cuts. The straightedge used to abut a side surface of the board being cut has an upper surface which is no higher than, and preferably coplanar with, the upper surface of the material being cut. The guide member is in the shape of a trapezoid having one acute angle, one obtuse and two diagonally opposed right angles. Both angled cuts can be made without rotating the device, with rotation of the saw guide device being required only for the square cut.

In a second embodiment of the invention, the guide is variable through angles of 45° on either side of perpendicular and is provided in a compact and sturdy design. A base member is held against the board to be cut and a guide member is adjustably secured to the base member. The guide member can be adjusted via screws to accommodate different blade offsets, and a retractable cut indicator is provided which indicates the cut position but then automatically retracts out of the way of the saw blade when a conveniently located retract mechanism is activated. An optional horizontal rule can be adjustably positioned along the saw guide.

A third embodiment of the invention is similar to the second embodiment in that it includes a fixed base in which a saw guide is adjustably secured. The guide is adjustable to accommodate different blade offsets and also includes a retractable cut indicator, with the guide being variable through 90° in one direction to therefore make any desired angle of end cut.

A common feature of the second and third embodiments is that the connection points are not fixed points of rotation but are instead movable points which are always located along the tangent line of a circle of some predetermined and fixed radius. This permits increased control over the position of the cut, and also permits attachment of the retractable cut indicator which can be housed in the fixed portion of the guide.

BRIEF DESCRIPTION OF THE DRAWINGS

The invention will be more clearly understood with reference to the following description in conjunction with the accompanying drawings, in which:

FIGS. 1A, 1B and 1C are top, front and right-side views, respectively, of a fixed-angle guide with fixed cut indicators according to a first embodiment of the present invention;

FIGS. 2A and 2B are composite views of a variable-angle guide device according to a second embodiment of the invention;

FIG. 3A is a top view of the fixed member 110 in FIG. 2A, while FIGS. 3B and 3C are front and right-side views of the same;

FIG. 4A is a top view of the retractable cut indicator 112 in FIG. 2A, while FIGS. 4B and 4C are side and cross-sectional views of the same;

FIG. 5 is a cross-sectional view of the spring loaded retraction mechanism for the cut indicator 112;

FIG. 6 is a composite top view of the variable saw guide mechanism according to the second embodiment of the present invention;

FIGS. 7A and 7B are side and end views, respectively, of the saw guide 114 in FIG. 6;

FIGS. 8A and 8B are side and end views, respectively, of the carrier-connector 116 in FIG. 6;

FIGS. 9A and 9B are side and end views, respectively, of the horizontal rule 118 in FIG. 6;

DETAILED DESCRIPTION OF THE PREFERRED EMBODIMENTS

Figure 2A:
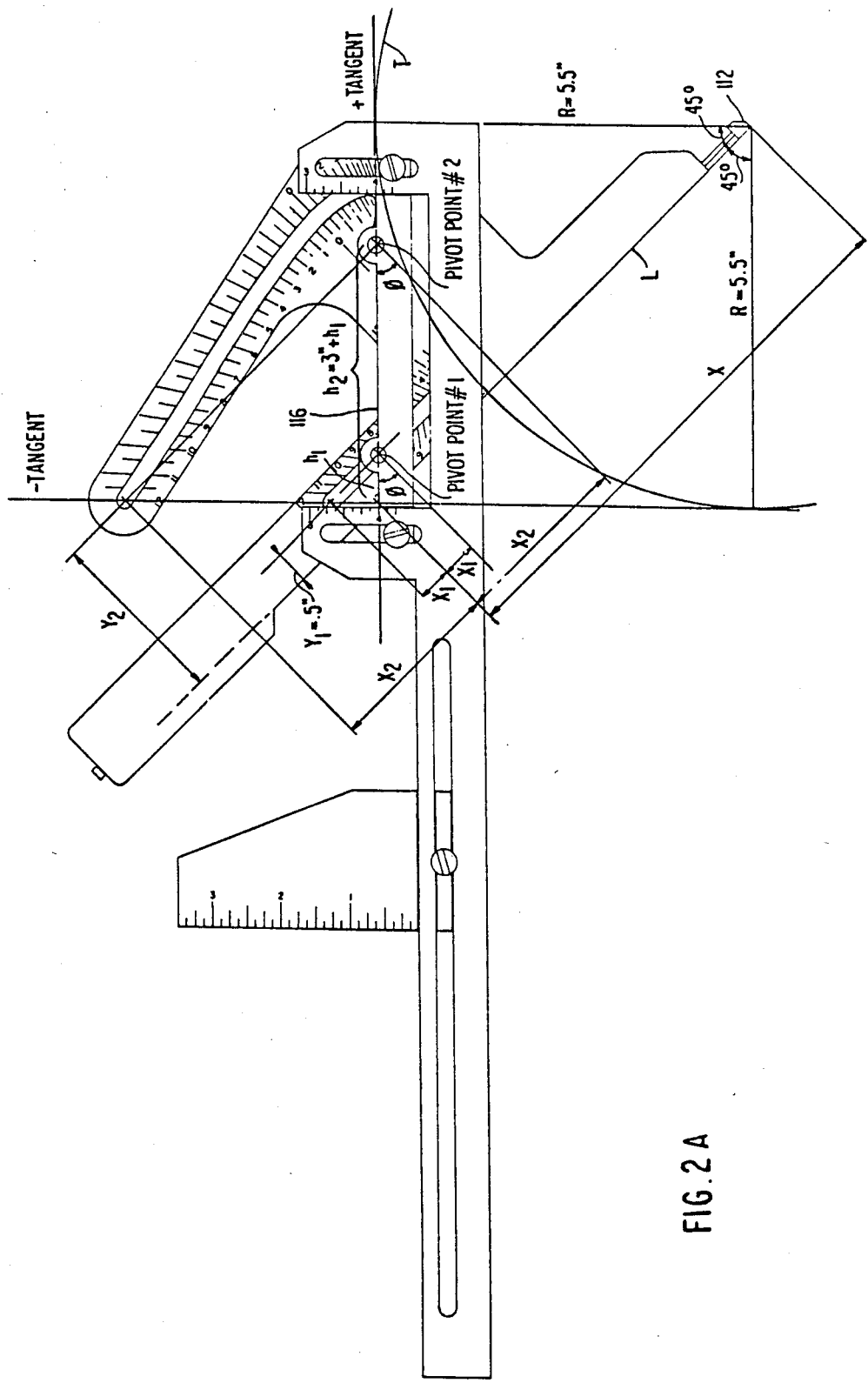

The first embodiment of the invention will now be described with reference to FIGS. 1A 1C, wherein one example of a fixed-angle saw guide with fixed cut indicators is illustrated. A use for which the illustrated saw guide would be especially suitable would be for cutting both angles normally encountered in making roof rafters, i.e., the "vertical" cut that occurs at rafter ends and the side of the plate notch, and the "horizontal" cut that occurs at the top of the plate notch. The device illustrated in FIGS. 1A–1C comprises two basic parts, a straightedge 10 to be held against the board and a multiple saw guide plate 12 which is attached to the straightedge 10 and rests on the top of the board. Both parts are made of a sawable material such as wood or plastic, and the straightedge 10 extends a sufficient length to either side of the guide 12 to accommodate all standard hand-held power saws.

When the left edge of the base plate of the power saw is passed along the guide edge 14, the saw blade will cut along the dotted line 16 and will permanently cut off the right-hand end of the straightedge 10, thus creating a cut indicator for all future cuts made with the same saw or a saw with an identical offset. The angle of this cut would provide the vertical cuts at rafter ends, bearing plate notches, etc.

When the right edge of the base plate of the power saw is passed along the guide edge 18, the saw blade will cut along the dotted line 20 and will permanently cut off that edge of the guide member 12, thus creating a further cut indicator. Future cuts made in a like fashion will provide the necessary angle for horizontal cuts at rafter bottoms, bearing plate notches, etc.

In the cuts made thus far, the surface 11 of the straightedge 10 would be held against the far side surface of the board being cut. By rotating the guide device and holding the surface 11 against the near side surface of the board being cut, the left edge of the base plate of the power saw can be passed along the guide edge 22 to create a saw cut along dotted line 24, thus cutting off that end (the left-hand end as shown in FIG. 1A) of the straightedge 10 and creating an indicator for the location of all future square cuts.

A significant feature of the guide device illustrated in FIGS. 1A–1C is that the top surface 13 of the straightedge 10 is flush with the lower surface of the guide member 12 and will therefore be coplanar with the top surface of the board being cut. The base plate of the power saw will not encounter any level change in making the transition from the board to the straightedge, or vice versa. This enables the saw guide to be used effectively with the straightedge 10 located on either the near or far sides of the board being cut. It is much more desirable that the guide be held against the far side of the board, since the two forces of holding the guide and pushing the saw are in opposition to each other. This is not possible in the fixed-angle saw guide of the above-discussed U.S. Pat. No. 4,054,077.

A further advantage of the saw guide illustrated in FIGS. 1A–1C is that the guide member 12 has a trapezoidal shape with one acute angle, one obtuse angle and two diagonally opposed right angles. The primary function of the guide illustrated in FIGS. 1A–1C is the cutting of both angles normally encountered in making roof rafters, i.e., the "vertical" cut that occurs at rafters ends and the side of the plate notch, and the "horizontal" cut that occurs at the top of the plate notch. These two angles are always complementary angles which will add up to 90° regardless of the roof pitch, and the angles will be equal only in the case of a 45° angle. The third guide surface is for a square cut when desired at the lower rafter end and/or for the many other components that go into a frame structure. Both primary cuts can be made without rotating the device. The vertical cut is made by passing the left side of the saw platform, along guide 14, while the horizontal cut is made by passing the right side of the saw platform along guide 18. The bonus square cut is made by rotating the device 180° and holding it against the near side of the board.

A right-handed user would not normally consider it acceptable to pass the right side of the saw platform in a leftward direction along the guide surface 18 in FIG. 1A, since it would be thought to be quite awkward to cut off a board in this cross-handed fashion. However, the guide surface 18 is typically used for cutting a notch which is seldom over 4 inches in width, and the cross-handed cutting is not excessively awkward.

For a saw with a left side offset of 4 inches, i.e., a distance of 4 inches between the blade and the left side of the saw platform, the perpendicular distance between edge 14 and line 16 in FIG. 1A would be 4 inches. For a saw with a right-side blade offset of 2 inches, the perpendicular distance between the edge 18 and the line 20 in FIG. 1A would be 2 inches. The cutting angles provided by the guide of FIG. 1A would be useful in cutting angles associated with roof pitches of 5 in 12 on boards 6 inches wide. It will be obvious, however, that the angles and dimensions of the device illustrated in FIG. 1A could be changed for making saw cuts for any roof pitch angle on boards of different widths.

A second embodiment of the invention will now be described with reference to FIGS. 2–9 which illustrate various aspects of a saw guide according to the second embodiment which is variable 45° to either side of perpendicular. FIG. 2A is a composite drawing of a complete device set for use with a saw having a blade offset of 4 inches with the variable guide set for cutting on a 12 in 12 pitch angle, i.e., 45°. FIG. 2B illustrates the device in cooperation with a workpiece 109 and a saw generally indicated at 111 and having a saw plate 113 and a saw blade in the position shown at 115. The saw motor and handle are omitted to more clearly show the manner in which the present invention guides the saw blade along a desired path. The basic components of the second embodiment of this invention are a fixed member 110 (alternatively referred to hereinafter as a "first" member) which is manually held against the board or item to be cut, a retractable cut indicator 112 which in its extended position indicates the exact point at which the actual saw cut will intersect the back edge of the board, a variable saw guide 114 (alternatively referred to hereinafter as a "second" member) along which the plate of the power saw is passed, a carrier-connector 116 which provides for (1) adapting the device for use with various saws of different blade offsets, etc., (2) interconnecting the fixed member 110 to the variable guide 114, and (3) setting the device at any desired angle, and an optional horizontal rule 118 which can be used to draw the cut lines for bearing plate notches, etc.

As shown in FIGS. 3A–3C, the fixed member 110 includes two slots 120 and 122 positioned in such a manner that (1) their corresponding setting points as indicated by the corresponding pitch angle gradation marks on scales 124 and 126 or on scales 128 and 130 maintain a constant predetermined amount of separation (e.g., 3 inches), and (2) lines drawn through the various corresponding pitch angle marks of scales 124/126 or 128/130 maintain a constant predetermined perpendicular distance (e.g., 5.5 inches) from the tip of the cut indicator 112 in its extended position.

Scales 124/126 indicate cut angles to the left of perpendicular, and scales 128/130 indicate cut angles to the right of perpendicular. In this example, the gradation marks are drawn in such a manner as to indicate roof pitch angles in increments of ½ unit from a zero unit vertical rise per 12 units of horizontal distance (square cut rafter for a flat roof) to a 12 unit vertical rise per 12 units of horizontal distance (45° angle above horizontal). If desired, the scales could be marked off in degrees or dual scales could be provided showing both units of angular measurement.

It is desirable that, regardless of the cutting angle, the path of the saw will pass through the tip of the cut indicator 112. Conventional, variable-angle saw guides utilize a single pivot point which is necessarily offset from the path of the saw blade, making it impossible to secure the cut location indicator to the fixed guide member. The variable angle saw guide according to the present invention solves this problem by providing two different pivot points and appropriately cut slots 122 and 124 which, regardless of the cut angle, are always located on a tangent line to a circle of some predetermined radius having its center at the tip of the cut indicator 112. This can be more clearly understood with reference to FIG. 2. As shown in FIG. 2, the tip of the indicator 112 can be considered to define the center of a circle T having a radius R. In the preferred embodiment, the radius R may have a length of 5.5 inches, which is best suited to accommodate a wide variety of blade offsets.

As described above, it is desirable that the path of the saw blade intersect the tip of the cut indicator 112 regardless of the angle of the guide. The line L passing along the edge of the fixed member 110 will be held against the side surface of the board being cut, and it is therefore desirable that the path of the saw blade pass through the line L at the same point of intersection regardless of the angle adjustment of the saw guide, as indicated by the dotted line 117 in FIG. 2B.

Since it is physically impossible to locate a single pivot point in the path of the saw blade, the present invention provides two different pivot points $P_1$ and $P_2$ both of which are offset from the path of the saw blade. With regard to the pivot point $P_1$, that pivot point is slidable within the slot 120 and its loci fall along a line which is parallel to the horizontal line L and which is offset by some arbitrary fixed amount from the horizontal line L. In the preferred embodiment, the amount of offset, i.e., the dimension $Y_1$, may be equal to 0.5 inches.

The pivot points $P_1$ and $P_2$ are offset from one another by a constant distance. In the preferred embodiment, the separation distance between the pivot points $P_1$ and $P_2$ may be 3 inches, since this would leave an adequate amount of hand room for gripping the fixed member. However, other distances could be employed if desired.

Referring again to FIG. 2A, it is noted that, in determining the various X and Y coordinates for the loci of pivot points ($P_1$, $P_2$), three right triangles must be considered with identical "pitch angles" ($\phi$), such that tangent $\phi$ is equal to Y/12, with Y varying from zero through 12. (The pitch angle is a unit used in defining the slope of a roof. In the case of a variable angle saw guide as illustrated in FIG. 2A, the number 8, e.g., indicates a roof slope of eight vertical feet for each twelve feet of horizontal distance, i.e., a pitch of 8 in 12. The pitch angle can be read from whichever one of the scales 124 or 128 includes a gradation marking running parallel to the lefthand edge of the carrier-connector 116.)

In the example shown in FIG. 2A, tan $\phi = 12/12 = 1$, and $\phi$ therefore equals 45°. Note that the values of X, $X_1$, $X_2$, $Y_1$, and $Y_2$ for a positive pitch (+ angent line), are identical to those of the same negative pitch (- tangent line), and can be determined by simple algebra and/or trigonometry as follows:

X = point of intersection of tangent line and horizontal line = 5.5"/cosine $\phi$.
$Y_1 = 0.5$" by design.
$X_1 = y_1$ (tangent $\phi$) = 0.5"(tangent $\phi$).
$h_1 = 0.5$ cosine $\phi$.
$h_2 = 3" + 0.5"$/cosine $\phi$.

$X_2 = x_1 h_2/h_1$, from $X_1$ is to $h_1$ as $X_2$ is to $h_2$, and similarly,
$Y_2 = y_1 h_2/h_1$.

By feeding enough values of X and Y into a computer-programmed milling machine, the slots for $P_1$ and $P_2$ can be perfectly cut in producing a die for casting the fixed member 110. When mated with a guide which has two holes with diameters equal to the width of the slots and a separation of exactly 3 inches center-to-center, the resultant instrument will perfectly track through angles of 90° %45° (or greater if desired). At all positions, a line drawn through the center of the two holes in the guide, i.e., the pivot points $P_1$ and $P_2$, will at all times be tangent to the same circle as T of radius equal to 5.5 inches.

By adjusting the distance between the line of tangency and the outside edge of the saw guide so that this distance plus the effective width of a given saw equals exactly 5.5 inches, then all future cuts with that same saw will occur at the same point on the horizontal line, regardless of the angle of cut.

Other features of the construction of the guide device according to a second embodiment of this invention will be apparent from the figures, and some may be briefly described as follows. As shown in FIGS. 3B and 3C, a groove 132 is provided in the fixed member 110 for accommodating the indicator slide 134. A spring loaded retraction mechanism, shown in detail in FIG. 5, is housed within a cavity 136 within the fixed member 110.

The cut indicator 112 operates as follows. The indicator 112 is attached to the slide 134 which also has a stop 138 and a tab 140, as shown in FIG. 4A. The tab 140 extends through a slot 142, shown in FIG. 3B, into the cavity 136. The indicator assembly is held in its retracted position by a retraction spring 144 which is connected to the tab 140 through hole 146 and to the end cap 148 via a protruding eyelet 150.

The mechanism is held in its extended position by a lug 152 on a lever 154. The lever 154 is pivotable about a pin 156 which passes through the body of the fixed member 110. The lug 152 is constantly energized with an upward force by a compression spring 158 which fits into grooves 160 on the top of the lever 154 and presses against the top of the cavity 136, forcing the trigger end downward.

The retractable cut indicator mechanism is operated via a trigger tab 162 on the bottom of the lever 154 which extends through a slot in the bottom of the cavity 136. The guide device will normally be held in the left hand, and cocking of the indicator device would be accomplished by pressing the stop 138 integrally formed at the rear end of the slide 134. Pressing on the stop 138 could be accomplished simply by pushing the saw guide against the board to be cut or against some other suitable hard object until the lug 152 engages the edge of the tab 140, thus holding the cut indicator 12 in its fully extended position. Once the indicator has been positioned at the point of the desired cut, the trigger tab 162 can be pushed upwards by a gripping finger, thus forcing the holding lug 152 downward into a release position, whereby the retraction spring 144 causes the cut indicator to slide backwards and out of the way of the cutting blade.

With regard to FIG. 6, the variable saw guide 114 has two tabs 164 on its upper rear side, each of which has a slot 166 and a groove 168 to facilitate the adjustment and clamping of the carrier-connector 116 to the saw guide 114. The tabs also have gradation marks 170 to facilitate calibrating the device to work with saws of varying base plate dimensions. Side and end views of the saw guide 114 in FIG. 6 are shown in FIGS. 7A and 7B.

As shown also in FIGS. 6, 7A and 7B, the saw guide 114 has an optional slot 172 and an optional groove 174 at its lower end to facilitate the adjustment and clamping of a horizontal rule 118.

As shown in FIG. 6 and in more detail in FIGS. 8A and 8B, the carrier-connector 116 has a threaded hole 176 at either end at which two clamping screws 178 fit in attaching the carrier-connector 116 to the saw guide 114. The carrier-connector 116 also has two additional threaded holes 180, the centers of which (1) fall along the line 182 of its backside and (2) are set the same predetermined distance apart as where the centers of the corresponding segments of slots 120 and 122 (e.g., 3 inches in the preferred embodiment).

As shown in FIGS. 3A and 8A, the carrier-connector 116 is attached to the fixed member 110 via two threaded bolts 184 and 186 which pass through the slots 120 and 122 in fixed member 112 and into two threaded holes 180 in carrier-connector 116.

Figure 9C:
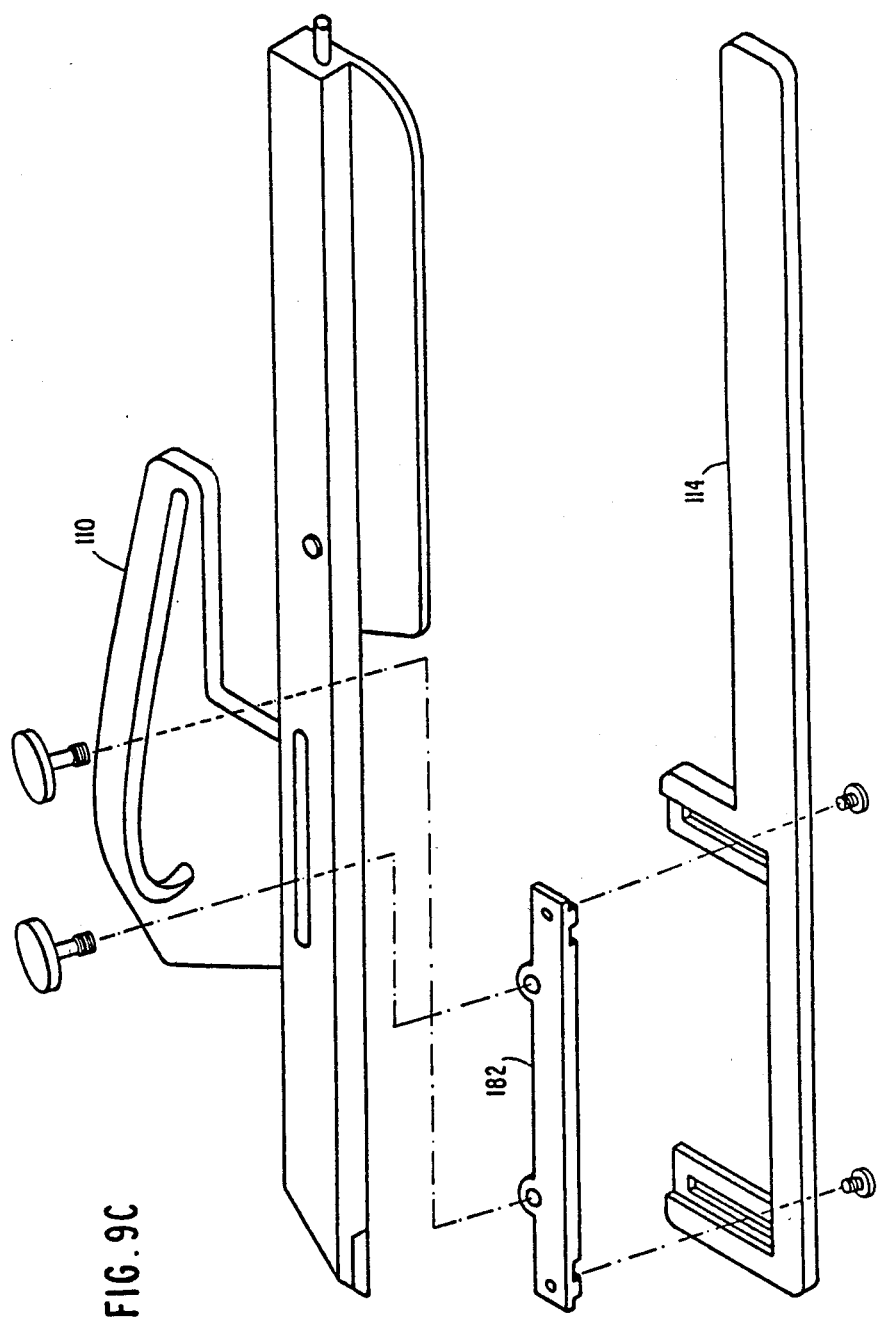
FIG. 9C is an exploded diagram illustrating the assembly of the second embodiment.
Figure 12:
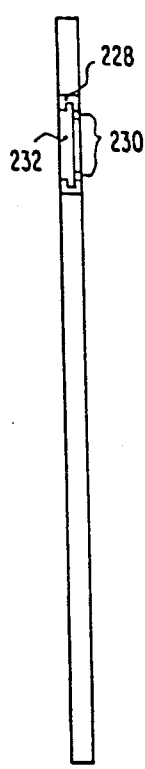
FIG. 12 is a left side view of the variable saw guide 214 in FIG. 10.

As shown in FIGS. 6, 9A and 9B, the horizontal rule 118 has grooves 188 and 190 which mate with the slot 172 and groove 174 of saw guide 114 (alternatively referred to hereinafter as a "second" member). Threaded hole 192 and clamping screw 194 allow the positioning of the rule. Gradation markings 196 allow the rule to be used in marking off the plate bearing notches in rafters, etc. The rule is not limited to the 3 1/2 inch effective length depicted in FIG. 6. FIG. 9C illustrates the assembly of the second embodiment.

With regard to FIGS. 2A and 6, the correct procedure for calibrating, to a given saw, the guide device according to the second embodiment of the invention would be to determine the blade offset of the saw, e.g., by making a test cut and measuring, and then setting the back edge 182 of the carrier-connector 116 to line up with the gradation markings 170 of corresponding value. The example shown in FIG. 2A is for a saw with a blade offset of 4 inches. Due to the novel geometry of the present invention, subsequent cuts with the same saw and blade will always pass through the point indicated by the tip end of the extended cut indicator 112, regardless of the angle of the cut.

Figure 10:
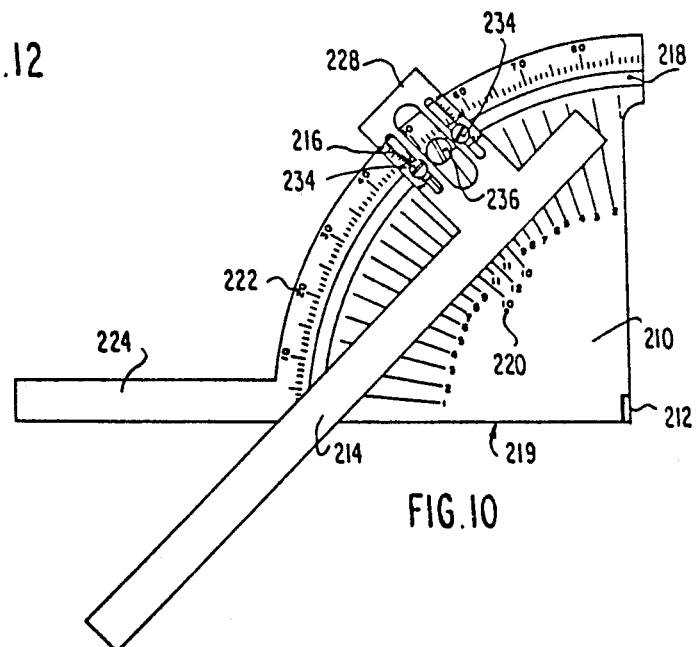
FIG. 10 is a composite top view of a variable-angle saw guide device according to a third embodiment of this invention.

A third embodiment of the invention will now be described with reference to FIGS. 10-13. As shown in FIG. 10, the basic components of the third embodiment are similarly a fixed member 210 which is held against the side of the item to be cut, a cut indicator 212 which in its extended position points to the exact location of the inside edge of future saw cuts, a variable saw guide 214 along which the saw is passed, and a carrier-connector 216 which interconnects the two major components and also acts as an adjustable carrier for changing the angles of the saw cuts.

This third embodiment illustrated in FIG. 10 is similar to the first embodiment in that the variable guide 214 is secured to the fixed member 210 through the intermediary of a carrier connector 216, just as the variable guide 114 in the second embodiment is secured to the fixed member 110 via the carrier connector 116. A further point of similarity is that the variable guide 214 is coupled to the carrier connector 216 at two points designated by screws 234, with a line passing through the two points always being tangent to a circle of constant radius about the desired cut intersection point indicated by the extended position of the retractable cut indicator 212, although it should be noted that this constant radius will be somewhat smaller than the radius of curvature of the slot 218. A distinction between the second and third embodiments, however, is that the carrier connector 216 in the third embodiment is coupled to the fixed member 210 by only a single screw 236 rather than the two pivot points 121 and 123. In the embodiment of FIG. 10, while a line passing through the screws 234 will be tangent to a circle of constant radius about the desired cut intersection point, this tangent line will not be parallel to the line of cut defined by the right-hand edge of the variable guide 214. The reason for this is that the mounting of the variable guide member 214 to the carrier connector 216 has been offset in order to permit the saw guide to be used for a perpendicular cut. More particularly, with the edge 219 of the fixed member 210 abutting the side of the material being cut, the carrier connector cannot slide down to a position at which the tangent line through the screws 234 is perpendicular to the edge 219, yet the guide should preferably be capable of guiding the saw in a perpendicular cut. Accordingly, the carrier connector and the projection 228 are offset slightly so that the guide edge of the variable guide member 214 will be perpendicular to the edge 219 when the carrier-connector 216 is slid to its lowermost position as shown in FIG. 10.

However, as long as the adjustment of the angle of cut is accomplished by sliding the carrier connector along the slot 218, the distance between the desired point of cut and the guide surface of the variable guide member 214 will remain constant, thereby ensuring that the saw blade will pass through the point indicated by the extended position of the cut location indicator 212.

Figure 11B:
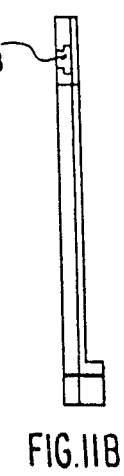
FIGS. 11A and 11B are front and side views, respectively, of the fixed member 210 in FIG. 10.
Figure 11A:
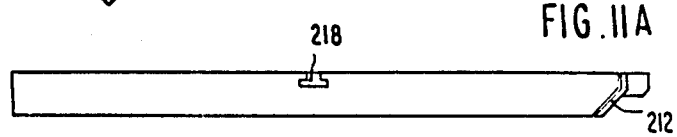
Figure 11C:
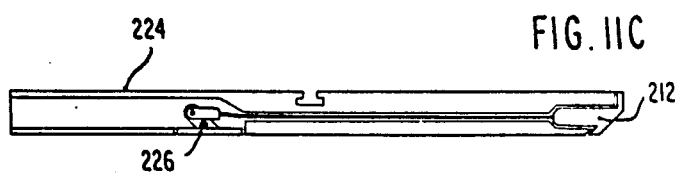
FIG. 11C is a cross-sectional view of the fixed member 210 in FIG. 10, showing another means of operating the retractable cut indicator 212.
Figure 13A:
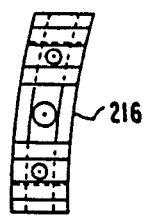
FIGS. 13A, 13B and 13C are top, front and right side views, respectively, of the carrier-connector 216 in FIG. 10.
Figure 13B:
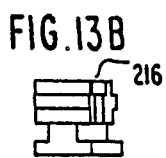
Figure 13C:
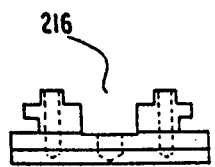

With reference to the particular structure of this third embodiment, and as shown in FIGS. 10, 11A and 11B, the fixed member 210 includes a circular slot 218 with a radius of proper size the center of which represents the point a saw cut will intersect the back edge of a board, i.e., the location of this center point is as indicated by the cut indicator in its extended position. The member 210 further includes two angular scales, with scale 220 indicating the angle of pitch and scale 222 indicating the angular degrees, The member 210 further includes a handle 224 which also houses a push-pull cut indicator mechanism 226.

As shown in FIGS. 10, 12 and 13A-13C, the adjustable saw guide 214 has a slotted and grooved projection 228 which is utilized to calibrate the position of the saw guide to the blade offset of any particular saw. The two slots 230 and groove 232 mate with the top of the carrier-connector 216 and are held in the desired position by two screw clamps 234. The bottom portion of the carrier-connector 216 mates with the groove 218 in the fixed member 210 and is held in position by screw clamp 236.

Calibration and use of the third embodiment illustrated in FIGS. 10-13 is identical to that previously described for the second embodiment, except that the desired angle is selected by aligning the lower edge 240 of the projection 228 with the proper gradation marking. The cut indicator 212 could be extended by pressing on the left-hand portion of the trigger 226 on which is pivotable about a central pin 227, and retraction of the indicator 212 could correspondingly be achieved by finger pressure on the right-hand end of the trigger 226. FIG. 10 illustrates the device set for use with a saw having a blade offset of 4 inches with the variable guide set for cutting on a 45° angle.

It should be pointed out that the device according to this third embodiment cannot be used for angles much greater than 80° due to the offset location of clamping screw 236. If desired, the upper portion of fixed member 210 that houses the grooved track 218 could be extended somewhat further for a full 90° capability. However, care would have to be taken to stop the saw before it hit this extension when making cuts of zero to 10°. Since the majority of cuts are either square (0°) or less than 76°, the shorter and safer dimensions illustrated herein may be preferable.

It should be noted that, while specific examples have been described above, various changes and modifications could be made to the described examples without departing from the spirit and scope of the invention as defined in the appended claims. For example, while in the first embodiment of the invention the members 10 and 12 are illustrated as separate members bonded together at a mating surface 13, the members could be of one-piece construction or could be bonded together in some other manner. Thus, although the components designated by Reference numerals 10 and 12 are referred to in both the description above and in the appended claims as "members", this terminology is used in its broad sense and is intended to cover a one-piece construction having portions corresponding in function to the members 10 and 12.

I claim:

1. A saw guide for use in cutting a work piece with a power saw, said work piece having at least first and second adjacent surfaces, said power saw having a cutting blade and a saw plate for sliding along said first surface of said workpiece as said blade extends beyond said saw plate and into said work piece for cutting, said saw guide comprising:

a first member disposed along said first surface of said work piece for guiding said saw plate along a desired path, said first member comprising a first layer of a material easily cuttable by said power saw blade and disposed adjacent said first surface of said work piece and a second layer disposed over said first layer and having at least one edge (18) for defining a saw plate path, said first layer extending beyond said at least one edge into said saw plate path; and a second member abutting said second surface of said work piece and extending into said path of said saw plate, the entire portion of said second member which is disposed in said path of said saw plate being at a level no higher than the level of said first surface of said work piece.

2. A saw guide for use in cutting a work piece with a power saw, said work piece having at least first and second adjacent surfaces, said power saw having a cutting blade and a saw plate for sliding along said first surface of said workpiece as said blade extends beyond said saw plate and into said work piece for cutting, said saw guide comprising:

a first member disposed along said first surface of said work piece for guiding said saw plate along a desired path; and a second member abutting said second surface of said work piece and extending into said path of said saw plate, the entire portion of said second member which is disposed in said path of said saw plate being at a level no higher than the level of said first surface of said work piece;

said first member including three guide edges disposed over said work piece when said second member is abutting said second surface of said work piece, each of said guide edges for guiding said saw plate along a respective path, and two of said guide edges being perpendicular to one another.

3. A saw guide for use in cutting a work piece with a power saw, said work piece having at least first and second adjacent surfaces, said power saw having a cutting blade and a saw plate for sliding along said first surface of said workpiece as said blade extends beyond said saw plate and into said work piece for cutting, said saw guide comprising:

a first member disposed along said first surface of said work piece for guiding said saw plate along a desired path, said first member including at least a first and second guide surfaces which are not parallel to one another for guiding said saw plate along respective different cutting paths; and a second member in a fixed position with respect to said first member and abutting said second surface of said work piece and extending into said path of said saw plate, whereby said saw guide may be used for cutting along first or second cutting paths which are not parallel to one another without changing an angular position of said first member relative to said second member.

4. A saw guide as defined in claim 3, wherein said second member has an upper surface substantially coplanar with said first surface of said work piece.

5. A saw guide as defined in claim 3, wherein said second member is of a material easily cuttable by said power saw blade.

* * * * *